(12) United States Patent
Burns

(10) Patent No.: US 7,728,552 B2
(45) Date of Patent: *Jun. 1, 2010

(54) BATTERY MANAGEMENT SYSTEM AND METHOD

(75) Inventor: Charles E. Burns, Lake St. Louis, MO (US)

(73) Assignee: American Power Conversion Corporation, West Kingston, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/227,853

(22) Filed: Sep. 15, 2005

(65) Prior Publication Data

US 2006/0012341 A1    Jan. 19, 2006

Related U.S. Application Data

(63) Continuation of application No. 10/305,805, filed on Nov. 27, 2002.

(60) Provisional application No. 60/333,536, filed on Nov. 27, 2001.

(51) Int. Cl.
*H02J 7/00* (2006.01)
*G01R 31/36* (2006.01)

(52) U.S. Cl. .................. 320/116; 320/106; 320/107; 320/126; 320/136; 702/63

(58) Field of Classification Search ................ 320/116, 320/126, 118, 122; 364/550
See application file for complete search history.

(56) References Cited

U.S. PATENT DOCUMENTS

| | | | |
|---|---|---|---|
| 3,940,679 A | 2/1976 | Brandwein et al. | |
| 4,139,846 A | 2/1979 | Conforti | |
| 4,217,645 A | 8/1980 | Barry et al. | |
| 4,303,877 A | 12/1981 | Meinhold | |
| 4,331,911 A | 5/1982 | Park | |
| 4,394,741 A | 7/1983 | Lowndes | |
| 4,553,081 A | 11/1985 | Koenck | |
| 4,673,826 A | 6/1987 | Masson | |
| 4,683,529 A | 7/1987 | Bucher, II | |
| 4,684,872 A | 8/1987 | Stewart | |
| 4,698,578 A | 10/1987 | Mullersman et al. | |
| 4,707,795 A | 11/1987 | Alber et al. | |
| 4,709,202 A | 11/1987 | Koenck et al. | |

(Continued)

FOREIGN PATENT DOCUMENTS

FR    77531    *    4/1983

OTHER PUBLICATIONS

Translation of FR-77531.*

(Continued)

*Primary Examiner*—Edward Tso
*Assistant Examiner*—Yalkew Fantu
(74) *Attorney, Agent, or Firm*—Lando & Anastasi, LLP

(57) ABSTRACT

A battery management system is disclosed for control of individual cells in a battery string. The battery management system includes a charger, a voltmeter, a selection circuit and a microprocessor. Under control of the microprocessor, the selection circuit connects each cell of the battery string to the charger and voltmeter. Information relating to battery performance is recorded and analyzed. The analysis depends upon the conditions under which the battery is operating. By monitoring the battery performance under different conditions, problems with individual cells can be determined and corrected.

13 Claims, 2 Drawing Sheets

U.S. PATENT DOCUMENTS

| | | |
|---|---|---|
| 4,743,830 A | 5/1988 | Lakey |
| 4,746,854 A | 5/1988 | Baker et al. |
| 4,820,966 A | 4/1989 | Fridman |
| 4,843,299 A | 6/1989 | Hutchings |
| 4,860,185 A | 8/1989 | Brewer et al. |
| 4,868,832 A | 9/1989 | Marrington et al. |
| 4,871,956 A | 10/1989 | Barrella |
| 4,885,521 A | 12/1989 | Crampton |
| 4,885,523 A | 12/1989 | Koenck |
| 4,918,368 A | 4/1990 | Baker et al. |
| 4,931,738 A | 6/1990 | MacIntyre et al. |
| 4,947,123 A | 8/1990 | Minezawa |
| 4,949,046 A | 8/1990 | Seyfang |
| 4,961,043 A | 10/1990 | Koenck |
| 4,965,462 A | 10/1990 | Crawford |
| 4,965,738 A | 10/1990 | Bauer et al. |
| 5,019,717 A | 5/1991 | McCurry et al. |
| 5,027,294 A * | 6/1991 | Fakruddin et al. ........... 713/300 |
| 5,043,651 A | 8/1991 | Tamura |
| 5,047,961 A | 9/1991 | Simonsen |
| 5,049,804 A | 9/1991 | Hutchings |
| 5,057,383 A | 10/1991 | Sokira |
| 5,089,937 A | 2/1992 | Carrubba et al. |
| 5,130,659 A | 7/1992 | Sloan |
| 5,136,231 A | 8/1992 | Faulk |
| 5,151,644 A | 9/1992 | Pearson et al. |
| 5,153,496 A | 10/1992 | LaForge |
| 5,159,272 A | 10/1992 | Rao et al. |
| 5,184,025 A | 2/1993 | McCurry et al. |
| 5,200,689 A | 4/1993 | Interiano et al. |
| 5,206,097 A | 4/1993 | Burns et al. |
| 5,206,578 A | 4/1993 | Nor |
| 5,216,371 A | 6/1993 | Nagai |
| 5,218,288 A | 6/1993 | Mickal et al. |
| 5,227,262 A | 7/1993 | Ozer |
| 5,229,650 A | 7/1993 | Kita et al. |
| 5,229,704 A | 7/1993 | Knepper |
| 5,254,928 A | 10/1993 | Young et al. |
| 5,258,244 A | 11/1993 | Hall et al. |
| 5,266,880 A | 11/1993 | Newland |
| 5,272,382 A | 12/1993 | Heald et al. |
| 5,278,487 A | 1/1994 | Koenck |
| 5,281,920 A | 1/1994 | Wurst |
| 5,281,955 A | 1/1994 | Reich et al. |
| 5,283,512 A | 2/1994 | Stadnick et al. |
| 5,300,874 A | 4/1994 | Shimamoto et al. |
| 5,315,228 A | 5/1994 | Hess et al. |
| 5,315,533 A | 5/1994 | Stich et al. |
| 5,319,571 A | 6/1994 | Langer et al. |
| 5,321,626 A | 6/1994 | Palladino |
| 5,321,627 A | 6/1994 | Reher |
| 5,325,041 A | 6/1994 | Briggs |
| 5,345,163 A | 9/1994 | Gibbons et al. |
| 5,349,282 A | 9/1994 | McClure |
| 5,349,535 A | 9/1994 | Gupta |
| 5,381,350 A | 1/1995 | Fiorina et al. |
| 5,382,893 A | 1/1995 | Dehnel |
| 5,422,558 A | 6/1995 | Stewart |
| 5,455,499 A | 10/1995 | Uskali et al. |
| 5,459,671 A | 10/1995 | Duley |
| 5,462,439 A | 10/1995 | Keith |
| 5,469,042 A | 11/1995 | Rühling |
| 5,477,091 A | 12/1995 | Fiorina et al. |
| 5,481,730 A | 1/1996 | Brown et al. |
| 5,485,073 A | 1/1996 | Kasashima et al. |
| 5,498,950 A | 3/1996 | Ouwerkerk |
| 5,504,415 A | 4/1996 | Podrazhansky et al. |
| 5,510,690 A | 4/1996 | Tanaka et al. |
| 5,532,523 A | 7/1996 | Tang |
| 5,541,490 A | 7/1996 | Sengupta et al. |
| 5,561,361 A | 10/1996 | Sengupta et al. |
| 5,563,493 A | 10/1996 | Matsuda et al. |
| 5,619,430 A * | 4/1997 | Nolan et al. ................... 702/63 |
| 5,629,604 A | 5/1997 | Sengupta et al. |
| 5,642,002 A | 6/1997 | Mekanik et al. |
| 5,666,040 A | 9/1997 | Bourbeau |
| 5,883,497 A | 3/1999 | Turnbull |
| 6,031,354 A * | 2/2000 | Wiley et al. .................. 320/116 |
| 6,181,103 B1 * | 1/2001 | Chen .......................... 320/106 |
| 6,184,655 B1 * | 2/2001 | Malackowski .............. 320/116 |
| 6,268,711 B1 * | 7/2001 | Bearfield ..................... 320/117 |
| 6,274,950 B1 | 8/2001 | Gottlieb et al. |
| 6,329,792 B1 | 12/2001 | Dunn et al. |
| 6,373,225 B1 * | 4/2002 | Haraguchi et al. .......... 320/122 |
| 6,469,471 B1 * | 10/2002 | Anbuky et al. .............. 320/118 |
| 6,803,678 B2 | 10/2004 | Gottlieb et al. |
| 6,983,212 B2 * | 1/2006 | Burns .......................... 702/63 |

OTHER PUBLICATIONS

Raytheon, BMS S52/4, "Battery Monitoring System", 1998, pp. 1-2.*
Vicor, "Designing a Battery Charger", Application Note, Jun. 1994, pp. 1-2.*
Raytheon, BMS S052/4, 'Battery Monitoring System', 1998, pp. 1-2.
Vicor, 'Designing a Battery Charger', Application Note, Jun. 1994, pp. 1-2.
Aylor et al. IEEE Transactions on Industrial Electronics, "A Battery State-of-Charge Indicator for Electric Wheelchairs", 39(5):398-409 (1992).
Bengtsson et al. IEEE, "A Low-Cost Battery Supervisory Device for Use with Valve-Regulated Batteries", pp. 398-402 (1988).
Buskmiller et al. IEEE, "Architecture of a Compact Battery Plant System Designed for the Diverse Customer Premise Market", pp. 365-370 (1992).
Churchill et al. IEEE, "Comprehensive Nonivasive Battery monitoring of Lead-Acid Storage Cells in Unattended Locations", pp. 594-601 (1994).
Embedded Systems Programming, "How to Talk Smart", file://G:\DATA\SRK\Powerware-APC\Battery Monitoring Articles-For Production\How . . . , pp. 1-7.
Feder et al. INTELEC 92, "Field & Laboratory Studies to assess the Stte of Health of Valve-Regulated Lead Acid Batteries: Part I—Conductance/Capacity Correlation Studies", Washington D.C. Oct. 4-8, 1992.
Goodloe et al. ACM, "Improving Performance of an Electrical Power Expert System with Genetic Algorithms", pp. 298-316 (1988).
Hawkins et al. IEEE, "Automated and Cost Effective Maintenance Tools", pp. 1-5 (1995).
Healy et al. IEEE, "A Microprocessor-Based Battery Management System", pp. 386-391 (1990).
Hopkins et al. IEEE, "The Use of Equalizing Converters for Serial Charging of Long Battery Strings", pp. 493-498 (1991).
James, "The Evolution and Application of Micro-Processor Control and Monitor Units in the Central Office Power Equipment", pp. 1-9.
Kiessling IEEE, "A Battery Model for Monitoring of and Corrective Action on Lead-Acid EV Batteries", pp. 191-193 (1994).
Laidig et al. IEEE, "Technology Implementation of Stationary Battery Failure Prediction", pp. 168-172 (1994).
Larsson, "Battery Supervision in Telephone Exchanges", pp. 1-5.
Martin, "Balancing Batteries, Power and Performance: System Issues in CPU Speed-Setting for Mobile Computing", Pittsburgh, Pennsylvania, pp. 1-121 (1999).
May IEEE, "A Decade of Progress with Valve-Regulated Lead/Acid Batteries", pp. 8-13 (1991).
May IEEE, "Valve-Regulated Lead/Acid Batteries for Modular Installation", pp. 68-74 (1994).
Miyazaki et al. IEEE, "intelligent Battery System for Fiber in the Loop", pp. 112-116 (1992).
Modisette IEEE, "A Total Battery Monitoring Program for the Telecommunications Industry", pp. 476-480 (1994).
Mulder et al. "A Microprocessor Oriented Data Acquisition and Control System for Power System Control", pp. 74-78.

Noworolski et al. IEEE, "A Microcomputer-Based UPS Battery Management System", pp. 475-479 (1991).

Noworolski et al. IEEE, "A Microcomputer-Based Battery Management System", pp. 177-180 (1991).

Parsons et al. IEEE, "The Need for Battery Monitoring", pp. 171-176 (1991).

Perra et al. IEEE, "Advanced Battery Monitoring and Charging Techniques for UPS", pp. 163-167 (1994).

Poulin et al. IEEE, "An Expert Management System for VRLA Batteries in Remote Telecommunications Center", pp. 497-504 (1994).

Schubert, "The Evolution of Ada Software to Support the Space Station Power Management and Distribution System", TRI-ADA '88, NASA Embedded Applications Track, pp. 344-362 (1988).

Steele IBM J. Res. Dev., "Uninterruptible Battery Backup for IBM AS/400 Systems", 45(6):763-770 (2001).

Suntio IEEE, "Imperfectness as a Useful Approach in Battery Monitoring", pp. 481-485 (1994).

Sutanto et al. EPE, "Battery Model for Use in Electric Vehicles and Battery Energy Storage Systems", pp. 1-10 (1999).

Udani, "Power Management of Permanent Storage in Mobile Computers", Written Preliminary Examination Part II, pp. 1-29 (1995).

Udani et al. "Power Management in Mobile Computing", pp. 1-11 (1996).

Udani et al. "The Power Broker: Intelligent Management for Mobile Computers", pp. 13.

Waltari et al. IEEE, "Survey and Evaluation of Battery Monitoring Methods and Results from User's Viewpoint", pp. 1-7 (1999).

Walter ACM SIGUCCS XXI, "Security in Unattended Computing Labs—Safeguarding Users as Well as Machines", pp. 267-271 (1993).

* cited by examiner

BATTERY MANAGEMENT SYSTEM AND METHOD

RELATED APPLICATIONS

This application is a Continuation of U.S. patent application Ser. No. 10/305,805, filed Nov. 27, 2002, now U.S. Pat. No. 6,983,212 which claims priority to U.S. Provisional Patent Application No. 60/333,536, filed Nov. 27, 2001.

BACKGROUND OF THE INVENTION

1. Field of the Invention

The invention relates to a method and apparatus for management of individual cells in a battery system, particularly electrochemical, rechargeable cells.

2. Discussion of Related Art

Typically, battery systems, such as battery banks or strings, include a plurality of individual cells. A "cell" can mean a single electrochemical cell comprised of the most basic units, i.e. a positive plate, a negative plate, and an electrolyte. However, as used herein, the term is not so limited and includes a group of basic cells that can comprise single unit as a component of a battery string. A battery or battery string is a series connection of units or individual cells.

There is a tendency for each cell within individual batteries, when connected in series, to have a different characteristics, such as energy storage capacity and discharge rates. These differences are caused be many variables including, but not limited to, temperature, initial tolerances, material impurities, porosity, electrolyte density, surface contamination, and age. A low-capacity cell will typically discharge more rapidly than the other cells. An overly discharged cell develops poor recharging characteristics and can be permanently damaged. A damaged cell will affect the operating characteristics of the entire battery. The damaged battery will have lower capacity and will become discharged more rapidly than a healthy battery. The failure of an individual cell can cause substantial damage to the battery system and accompanying equipment. For example, recently the failure of one cell of a battery string caused an entire turbine generator to be destroyed. Therefore, a need exists for a system to monitor individual cells and to prevent overly discharging cells.

Various mechanisms have been developed to monitor and charge cells in a battery string. The classical means for controlling a batter is to balance the cells through equalization charging. This involves passing a low current through the battery pack thus charging the low cells while the fully charged cells slowly evolve gas (through electrolysis). It is done at a low current to minimize damage to the "good" cells. However, balancing is a slow process. Also, continuous charging of the battery may cause some cells to be overcharged, which further damages the cells. Other prior art approaches use complicated circuits connected to each cell for voltage monitoring and charging control.

Devices in the prior art are capable of detecting failing cells and responding to protect the remaining cells of a battery. For example, U.S. Pat. No. 5,258,244 measures voltage differences across individual cells using internal impedances of each cell. Failing cells, as determined by an increase in their internal impedance, may the be isolated from the other cells. U.S. Pat. No. 4,871,956 monitors the condition of cells by sequentially sampling the voltage of each cell and comparing the sampled cell voltage with a reference voltage to generate voltage differences which are stored in a shift register for each cell. If the voltage difference is sufficiently high, the cell is isolated from the other cells.

However, such systems have generally not automatically managed batteries effectively, or in a cost-conscious manner. Furthermore, such systems have not utilized the processing power of computers in connection with battery management. The lack of consistent individual treatment leads to premature deterioration, individual cell failures and failure of the entire battery string or bank, which in turn can lead to costly problems or downtime in the system that the battery serves.

U.S. Pat. No. 5,206,578, is exemplary of battery chargers that control only the external battery charge for an entire battery, rather than addressing the individual cells of the battery. Generally, such systems turn off, up or down the external battery charger to improve the condition of one cell at the possible expense of the other cells of the battery. The device of the aforementioned patent does not have the capability of singling out individual cells and then charging those cells. The device of the aforementioned patent does not appear to have electrical isolation from ground. Generally, the device of the aforementioned patent would tend to have noise problems in an industrial environment. Additionally, the device of the aforementioned patent does not appear to have the ability to store test data, nor does it have the ability to analyze the voltage of the individual cells or perform capacity tests.

U.S. Pat. No. 5,498,950 discloses a system for charging and monitoring automotive batteries that purports the ability to measure the voltage of constituent cells individually. Nevertheless, other than measuring the voltage of the cells and charging them when they are not fully charged, the system does not offer a comprehensive ability to manage a battery system.

Other examples of devices relating generally to the present invention, and incorporated by reference herein, include U.S. Pat. Nos. 4,743,830; 4,331,911; 5,283,512; 4,303,877; 4,820, 966; 5,153,496 and 5,136,231.

Additionally, the need has long existed for an electronic, computer-based battery management system that is transparent to the equipment connected to the battery and is suitable for electrically noisy environments. Therefore, a need exists for a comprehensive battery monitoring system which can monitor individual cells or units of multiple cells within a battery string and can properly manage the system to obtain improved battery performance.

SUMMARY OF THE INVENTION

The deficiencies of the prior art are substantially overcome by the management system of the present invention which includes a charging circuit, a voltmeter, a selection circuit, and a microprocessor. The management system provides a combination of monitoring unit parameters such as voltage, discharge current, unit charge current acceptance characteristics, electrochemical stability, environment temperature and representative unit temperatures, followed by actions by the invention that include corrective charging of individual units, successful integration of new replacement units into existing strings that contain multiple units with a variety of individual internal resistances, detection and notification of unfavorable trends and alarming out of tolerance parameters of the individual units and the battery string. The charging circuit and voltmeter are selective connected, using the selection circuit, to the cells in a battery string under different conditions. The conditions and voltage information from the voltmeter are recorded and analyzed by the microprocessor to determine the condition and operative characteristics of each cell in the battery string. If problems are detected, the system can take appropriate measures, such as charging a specific cell, or can trigger an alarm or message to an operator. The stored and analyzed information can be used by an operator to determine the condition of, operation of, or any needed servicing or replacement for the cell of the battery. According to one aspect of the invention, the management system achieves, at optimum mode, a 1% overall charge state balance of the units within the battery string.

According to another aspect of the invention, the monitoring system is electrically isolated from the battery and has sufficient noise rejection to make it suitable for electrically noisy industrial environments.

The present invention provides methods and apparatus for battery management, namely a battery management system, capable of first detecting problems and then acting upon those individual battery unit problems by providing a corrective charge or annunciation when problems cannot be corrected, which has at least one of the following characteristics or abilities:

- to individually monitor, test and confirm the electrochemical status of each unit in a battery string;
- to alarm each unit individually if the management system cannot correct the problems;
- to manage an entire battery string, typically comprising at least 6 cells;
- to determine the voltage and discharge current of an entire battery string;
- to give an alarm when the voltage of the battery string is not within certain limits;
- to detect and monitor the temperature of the overall environment of a battery, and the temperature of at least one representative unit in the bank and give an alarm if the temperature is out of limits;
- to store all of the test and alarm data about the individual units and the bank on storage media;
- to be compatible with known computer systems customary currently in existence;
- directly accessible, and remotely accessible;
- capable of date and time stamping all data;
- capable of automatic testing of the units and battery string at predetermined intervals;
- an automatic saving of test results to electronic storage media;
- with the ability to do real time testing of the units through a remote system or through direct input;
- that eliminates the need for equalized charging (which intends to balance the units, but overcharges fully charged units to bring up the charge of undercharged units);
- that minimizes water loss and minimizes maintenance of the batteries, creating more reliable and longer life batteries at lower expense
- capable of total user control and user programming
- capable of establishing the performance of the battery
- capable of confirming the relative charge state of each unit;
- capable of confirming the electrochemical stability of the battery string; and capable of confirming the temperature stability of each unit.

Generally, the present invention relates to the management of stationary batteries in standby applications for the purpose of monitoring and alarming critical battery parameters, extending battery life and improving the reliability of critical power loads.

According to another aspect of the invention, the battery management system is controlled by a microprocessor and may be interfaced with a remote personal computer. The system is capable of selectively coupling to any one of the individual units of the battery to measure its characteristics, including voltage, discharge current, temperature and electrochemical status by providing electrically isolated charging current from the system isolated power supply to any individual unit of the battery for the purpose of confirming the electrochemical stability and maintaining an equal individual unit state of charge. The coupling is safe, electrically isolated and positive.

According to another aspect of the invention, the battery management system performs a "discharge knee" test. The system monitors the voltage levels of the cells to a battery condition indicative of a rapid rate of voltage decay that could result in loss of the critical load and potential permanent damage from polarity reversal of one or more cells in the battery. An alarm or other notification is activated upon detection of such a condition.

DETAILED DESCRIPTION OF THE PREFERRED EMBODIMENTS

The overall purpose of the system is to automatically manage each individual battery unit, one of a plurality of cells in a battery string under dynamic and static conditions. The identity of multiple individual units exhibiting a problem is visually prompted along with a detailed time dated report on the system disk and/or printer.

Figure 1:
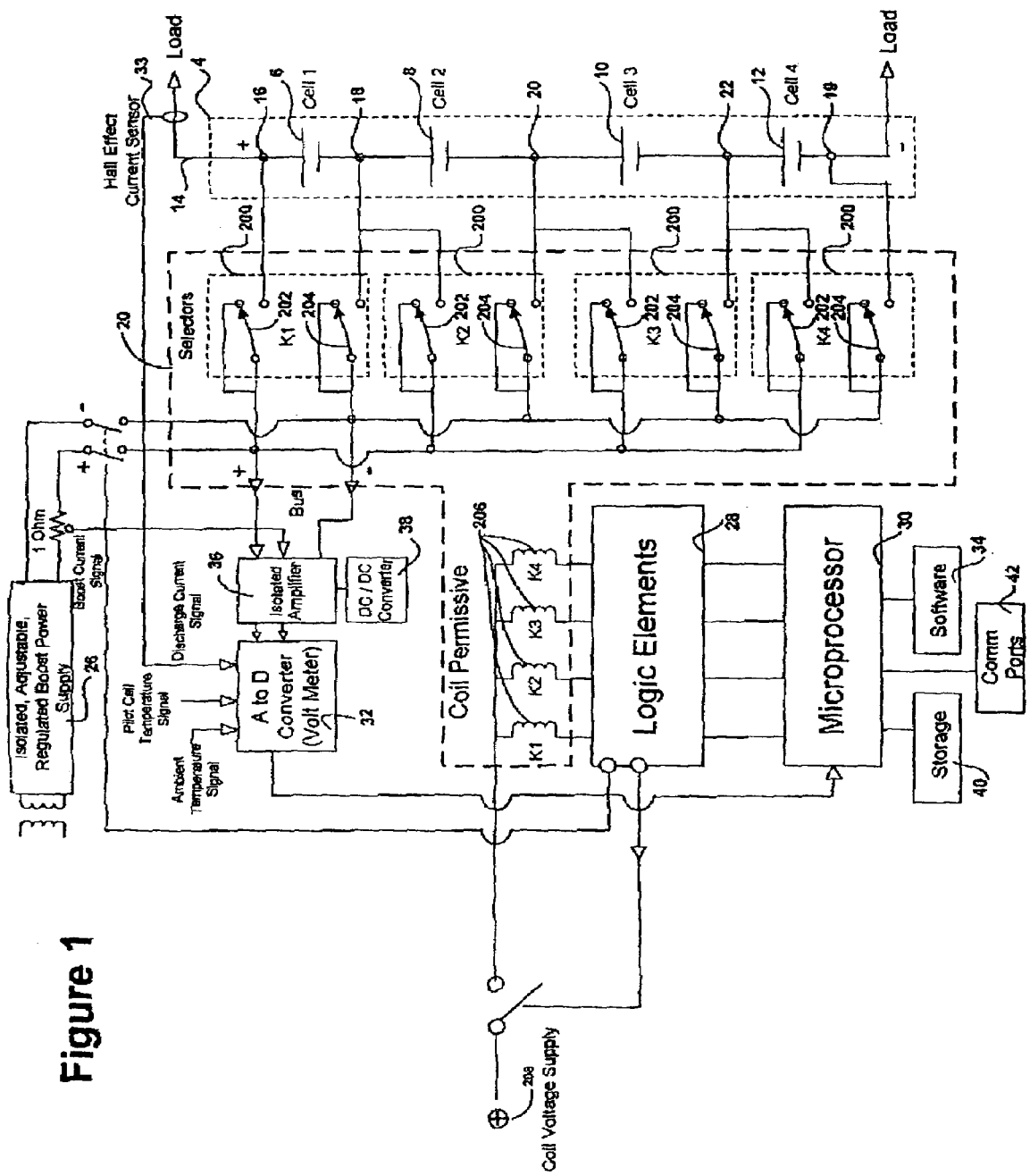
FIG. 1 is a block diagram of the apparatus of the invention.

FIG. 1 illustrates the overall apparatus for managing a battery according to the present invention. The system is used in conjunction with an "external" or "main" charger that is used for bulk charging of the battery and is not shown. Likewise, the load is not shown. As shown therein, a battery string 4 has a plurality of cells 6, 8, 10, 12 (only four are shown, for illustrative clarity) connected electrically in series with one another by cell connectors or terminals 18 (between cells 6 and 8), 20 (between cells 8 and 10) and 22 (between cells 10 and 12). A first one of the series of cells has a terminal 16, and a last one of the series of cells has a terminal 19. These terminals are regarded as the terminals of the battery string or battery 4. The terminals provide for access to each individual cell in the battery string. Each cell has a positive and a negative terminal associated with the positive and negative plates of the cell (indicated by + and − in the drawings).

A selector or coupling mechanism 20 is operable to make connections to the appropriate terminals of each cell so that each individual cell 6, 8, 10, 12 of battery 4 can be analyzed or charged, as described in greater detail below. Selector 20 is responsive to command signals from a logic controller 28 and microprocessor 30.

An isolated boost power supply or charger 26 for delivering electrical energy to a cell is selectively connected to one of the individual cells 6, 8, 10 and 12 by selector mechanism 20. Isolated boost power supply 26 is a fixed (but adjustable) voltage power supply that is magnetically isolated from its own energy supply (not shown) by a transformer and is capable of delivering as much as two (2) Amperes of direct current for charging cells. The isolation prevents ground fault errors in the external connected equipment.

Measurements of cell voltage are taken by an electrically isolated analog-to-digital converter (used as a digital voltmeter) 32, in response to program instructions (software) 34 residing in microprocessor 30. The cell voltage measurements are taken individually and in sequence (first cell, second cell, etc.) at a predetermined rate or sampling frequency. Thus, for a given number of cells, the time interval over the sampling period is always known (or can be calculated given the sampling rate). The output of supply or charger 26 is the input to both voltmeter 32 and a cell through a one (1) Ohm resistor, which provides a voltage drop that is proportional to the output current to the selected cell being charged. Thus, the current flowing from charger 26 is indicative of the electrochemical status of the cell being charged (i.e. if current flows at a higher rate, the cell is undercharged; if current flows at a lower rate, the cell is more fully charged; variations in current flowing to the cell can indicate electrochemical deterioration in the cell and associated connections).

When charger 26 is connected, current flows from charger 26 to selector mechanism 20 and ultimately to battery string 4 or from battery string 4 to selector mechanism 20. Voltage can be measured between selector mechanism 20 and voltmeter 32 when charger 26 is connected (as described above). When charger 26 is disconnected, the system is static. The invention can uniquely ascertain voltage while charging and discharging of the battery is occurring and under no-load conditions. Each cell can be thus be continuously analyzed to confirm availability and electrochemical status.

To permit voltage measurements that are transparent to the associated connected equipment and load, a signal conditioner 36 is provided for electrical isolation and scaling of the voltage signal from the selector mechanism 20 and/or from the charger 26 respectively. The signal conditioner 36 includes an isolated dc-to-dc converter 38 and an optical isolator. The optical isolator isolates and filters the electrical input signals by a light transmission step.

The analog output of conditioner 36 is the input to an analog-to-digital voltmeter 32, which is coupled to feed digital voltage measurements to microprocessor 30. The proportional output signal (through the one Ohm resistor) of supply or charger 26 is also input to voltmeter as is ambient temperature data and "pilot" cell temperature data, both of which are measured by conventional temperature probes associated with one of cells, 6, 8, 10, 12 (for pilot cell or battery temperature data) and the operating environment (for ambient temperature data). Also, a Hall effect current transducer 33 is coupled to the output conductor 14 of the entire battery to measure the discharge current under load, which is transmitted to voltmeter 32 for conversion and ultimate input to microprocessor 30. By virtue of being a Hall effect transducer, the current measurement is isolated from system noise and grounds.

Microprocessor 30 receives the digital signals of voltage, charge current, discharge current and temperature from digital voltmeter 32. Software 34 on the microprocessor 30 acts as instruction means for recording and analyzing the output of the digital voltmeter. Thus, the system according to the present invention can perform the tests described elsewhere in this specification as well as tests devised by the operator.

Digital storage, in the form of magnetic or electronic storage media, is depicted as storage means 40 and is operably associated with the microprocessor 30 for recording the value of the predetermined relationships, the value of the digital signals, and other information. Microprocessor 30 has further instruction means in 34 which causes the processor to actuate selector mechanism 20, as described below.

Data ports 42 permit remote access, via modem or other means, to the system for analysis, acknowledgment of alarms and control of all functions. Fiber optics or wireless modems could be used for telecommunication networks and hook up. A remote terminal may be provided and connected through data ports 42 for entering information, acknowledgment of alarms and function commands and for set-up of the system, such as alarm limits, intervals between discrete tests, calibration factors and security passwords for the system. The terminal may also be used for viewing outputs in graphic form or digital form and for the real-time monitoring of the system and a printer may be provided for printing out hard copy from disc or data files, alarm data or measured data or results of tests.

As can be seen in FIG. 1, selector 20 comprises a plurality of double-pole-ganged electromechanical relays 200 interposed between the cells 6, 8, 10, 12 and the voltmeter 32 The double-pole-ganged relays have two sets of contacts 202, 204 operating in tandem. Each contact is coupled to a terminal (+ and −) so that when the relay is closed, the cell is electrically coupled to the remainder of the circuit for charging or measurement. Because the relays are double-pole-ganged, energizing and actuation of a coil 206 closes or opens the relay contacts thereby places the cell in or out of the remainder of the circuit. One actuation coil 206 is associated with each relay 200. Although coils 206 are shown as separate from the relays in the schematic of FIG. 2, they are integral with the relays themselves. A conventional coil power supply 208 is provided to energize coils in response to actuation by logic 28 and microprocessor 30. Coil power supply can also power microprocessor 30 and other components not critically involved in charging and measuring the characteristics of the cells.

Having more than one cell connected into the circuit at one time, because of a closed or malfunctioning relay is not desirable and will yield false measurement data and possibly damage components of the system. Thus, each coil is electrically coupled to microprocessor 30 and logic elements 28 (which may be part of microprocessor, although illustrated as separate). If any of the relay contacts 202, 204 are closed, current will flow from the associated cell to microprocessor 30 and logic elements 28. Only if none of the contacts are closed and no current is flowing will microprocessor 30 and logic 28 permit any of the coils 206 to be energized to close another pair of contacts. Thus, an interlock is provided to prevent the closing of more than one pair of contacts unless all of the other pairs of contacts are open and no current is flowing.

The invention is applicable to batteries having (including) a large number of series-connected cells. Batteries having up to 1000 or more cells are envisioned for use with this process. At least 264 individual cells exhibiting a problem in long battery strings have been known to benefit from the "smart" battery management system of the present invention, which additionally provides a detailed time-dated report on the system disc or printer.

The entire process, detailed herein below, can be directed remotely, such as by a modem link. Generally, the invention is directed to automatically carrying out one or more of the following processes:

(1) Performing a Current Response Test, for confirming that the electrochemical status of the battery, including charge state, temperature and circuit resistance, is stable. Each of the cells is charged individually from the isolated charge source, one at a time, and the current flowing from the isolated charger is measured and compared to previously benchmarked individual current values. An alarm (which may be audible, visual, or simply recorded data) is sounded if any individual cell measured value exceeds the threshold deviation from the benchmarked value.

(2) Performing a Bank Discharge Test, for the purpose of identifying weak cells in the battery. In this test, the cell voltages are measured and recorded while a discharge current is flowing from the battery during a planned or unplanned discharge event The voltage across the terminals of each of the cells is measured sequentially at a rate of 25 cells per second while measuring the discharge current from the bank. Any cell whose relative voltage is lower than the other cells is identified (the voltage and cell recorded) and the average discharge current over the sample interval is recorded and stored. Thus the amp-hour capacity of the battery can be calculated and recorded.

Each of the aforementioned tests can be conducted either alone, or in combination with other ones of the tests, in order to manage the condition of the battery. Results of each of the tests (e.g., identification of a weak cell) can be recorded for reference. Other tests, both conventional and of a user's own creation, can be programmed into the present invention using conventional programming techniques and algorithms.

Figure 2:
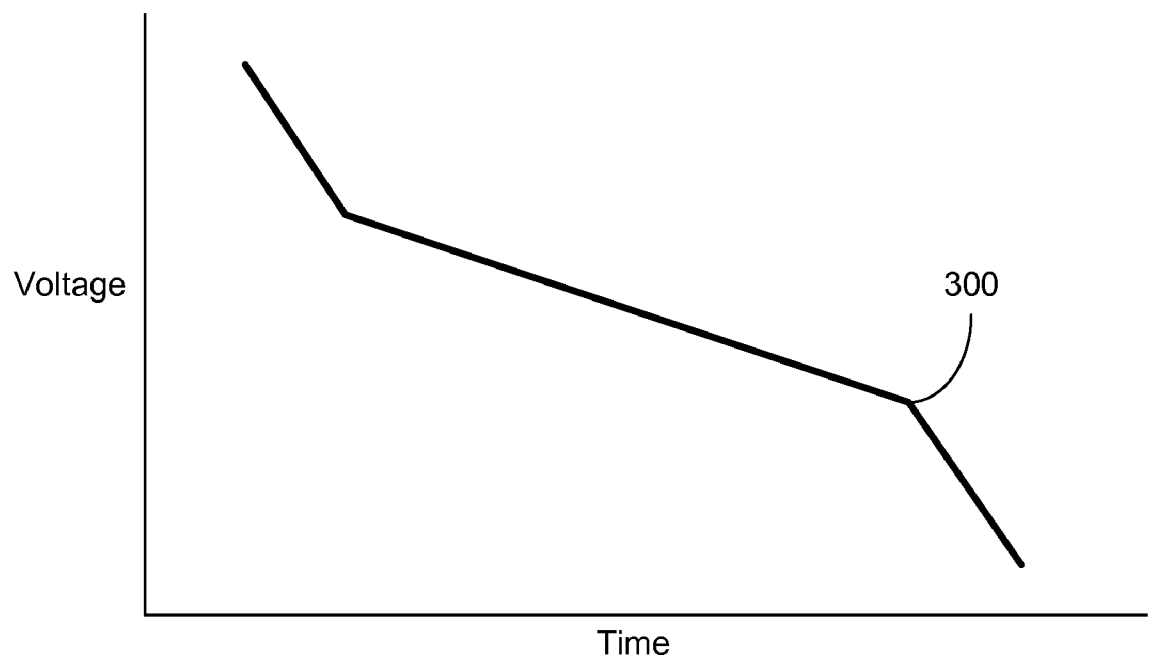
FIG. 2 is a graph displaying the discharge/time curve of a battery and the "discharge knee."

FIG. 2 is a graph of voltage (y-axis) versus time (x-axis) for a battery (it is the superposition of similar curves for each cell making up the battery). This graph illustrates the voltage decay of a battery over time. As the battery nears the end of its capacity, the slope of the voltage curve changes, at 300, and becomes more sharply negative. This is commonly referred to as the "discharge knee." When a battery reaches the point during a discharge that is represented by the discharge knee, the battery voltage will deteriorate more rapidly and the likelihood that critical load will be lost and/or one or more individual cells will reverse polarity and be permanently damaged is increased.

Thus, the discharge knee can be an early indicator of impending battery failure. The present invention detects and signals the discharge knee by summing sequential voltage samples for the cells at regular intervals. The most recent suite of summed sampled cell voltages is compared to the immediately past suite of summed sample voltages. If the value of the most recent suite varies from the previously measured suite by a selected amount (20% is preferred, but the amount can vary depending on conditions), then the discharge knee is "detected" and an external alarm is signaled to enable an appropriate response, which may include reducing the load on the battery, removal of the battery from service, or the like. The detection algorithm employs substantially the following formula:

$$\left| \sum_{n=1}^{4} V_{nt} - \sum_{n=1}^{4} V_{v(t-1)} \right| \leq .20$$

in which V is the measured voltage, n is the number of cells or units (4 is used in accordance with the illustration), and t is the time of the sample (i.e. most-recent (t) versus immediate past (t−1)).

With the apparatus of the present invention, it is possible and convenient for a user to automatically perform a robust suite of battery management tasks, including but not limited to any one of:

(a) individually monitor the voltage and relative charge state of each cell in a battery string under various test conditions, (wherein the battery string has at least 2 cells);
(b) annunciate an alarm when a single battery cell is outside programmed limits and display which cell has failed;
(c) test an individual cell for proper voltage and electrochemical stability;
(d) monitor an entire battery (at least 2 and well over 120 cells) for possible failure;
(e) determine the entire battery voltage, load current and capacity;
(f) annunciate an alarm for the entire battery when the voltage falls outside certain limits;
(g) detect, monitor and annunciate an alarm if the air temperature or the surface temperature of at least one representative ("pilot") cell of the battery exceeds a defined level;
(h) store all of the test and alarm data concerning the battery and the individual cells on storage media;
(i) be compatible with known computer systems;
(j) be remotely accessible, either directly or indirectly, such as by networks and phone lines;
(k) perform testing that is date, time and temperature stamped;
(l) have automatic testing performed at predetermined intervals;
(m) have automatic data storage of test results, alarms and date, time, temperature information on electronic storage media;
(n) do real time testing of the battery cells on the battery through the remote system;
(o) eliminate the need for "equalize charging";
(p) have a system that minimizes the need for the addition of water and for manual testing of the batteries, in particular, a system that does not require the manual hydrometer testing that is customary in the business to which the invention relates;
(q) have a system which is user programmable for the testing of the batteries; and,
(r) be able to perform sufficient testing of the batteries in the form of a quick, confidence test or a more lengthy comprehensive capacity test.

By being able to analyze and treat each cell of a battery individually, problems associated with gross treatments (e.g., charging an entire battery irrespective of the conditions of the individual cells) are circumvented. Moreover, a high degree of control is afforded by the cell-by-cell techniques of the present invention.

The software program will preferably automatically execute when the power switch is turned on and the program will manage the cell testing according to the instructions from the user setup file. The system disk drive will store the collected data along with a complete time dated history of each alarm event, for each cell and the bank. The on-board DC power supply will supply charge current automatically to any cell whose charge state lags the average of the string.

The individual cells are continuously and sequentially tested for proper voltage while the entire battery string is being charged. An alarm will activate if any cell or the entire bank exhibits voltage outside of the minimum or maximum window specified. At a programmed time, the test data from each cell will be logged to the disk under the test conditions specified at setup.

Each alarm event is saved on the disk with date, time, test type, voltage, discharge current and both ambient and pilot cell temperatures. The disk may be accessed at any time, reviewed and printed out on any compatible computer. Downloading of data and remote control of the system functions may be facilitated via direct connection, networks or modem.

Unauthorized use of the system and setup values are protected by a password. All critical data processing and other computer controlled operations rely upon an uninterrupted, continuous supply of electrical energy. The storage battery is insurance against the occasional loss of utility power, when its role becomes crucial in the prevention of disastrous consequences.

A regular program of monitoring and testing each of the multiple battery cells during non-emergency periods is essential to maximize the likelihood of equipment functioning during and emergency.

The present invention permits a choice of active or passive modes of operation. Operation of the present invention can be automatic, manual or a combination of these. The present invention involves a fill-in-the-blank user setup screen. The present invention involves battery capacity testing under actual load conditions. The battery capacity can be indicated in amp-hours and actual time. The "Weak Link" cell is identifiable after the bank discharge test. The present invention is capable of balancing each cell in the battery bank to within 1%. The present invention can be used to identify individual defective nickel cadmium, lead-acid or other rechargeable cells.

The present invention can provide a detailed report of each alarm event. It is capable of remote control and down-loading of data via networks or telephone modem. It can utilize an on-board disk drive to store all information. The invention can import data into spread sheets for graphical presentation and analysis.

The invention has been described with reference to preferred embodiments thereof. The invention is not thus limited, but is susceptible to variation and modification without departing from the scope and spirit of the invention, which is defined in the claims.

The invention claimed is:

1. A method for managing a battery having a string of units electrically connected in series, each of the units having positive and negative terminals, the method comprising the steps of:
   supplying charge selectively to a selected single unit of the string of units electrically connected in series with a charging circuit;
   measuring the voltage across the terminals of the selected unit of the battery with a single voltage detector circuit;
   recording an output of the voltage detector; and
   detecting a discharge knee characteristic of the battery based on the output from the voltage detector for the unit, detecting the discharge knee including the steps of:
   periodically sampling a voltage of the selected unit;
   comparing a sum of sampled voltages for a first selected time interval to a sum of sampled voltages for a second selected time interval; and
   determining a knee discharge characteristic if a difference between the compared sums exceeds a threshold value.

2. The method of claim 1 further comprising selectively connecting a unit to a charge circuit for supplying charge to the terminals of a unit of the battery.

3. The method for managing a battery according to claim 1, further comprising the steps of: determining a condition of operation of the battery, wherein the condition of operation includes one of an ambient temperature, a pilot cell temperature and a discharge current; and recording the determined condition.

4. The method for managing a battery according to claim 1, further comprising the steps of: determining a problematic condition for at least one unit of the battery based upon recorded data; and activating an alarm when a problematic condition is detected.

5. A method for managing a battery having a string of units electrically connected in series, each of the units having positive and negative terminals, the method comprising the steps of:
   supplying charge to a selected unit of the battery with a charging circuit;
   measuring the voltage across the terminals of the selected unit of the battery with a single voltage detector circuit;
   recording an output of the voltage detector;
   detecting a discharge knee characteristic of the battery based on the output from the voltage detector for the unit, detecting the discharge knee including the steps of:
   periodically sampling a voltage of each unit in the battery;
   summing together the sampled voltages over selected time intervals;
   comparing a sum of sampled voltages for a first selected time interval to a sum of sampled voltages for a second selected time interval; and
   determining a knee discharge characteristic if the difference between the compared sums exceeds a threshold value.

6. The method for managing a battery according to claim 2, further comprising the step of:
   determining a current flowing through the charge circuit when connected to a unit of the battery;
   determining a voltage level for the unit connected to the charge circuit based upon the detected current; and
   recording the voltage level.

7. The method of claim 2 further comprising automatically controlling the coupling of a unit of the battery to one of the voltage detector circuit and the charge circuit based on a condition of the unit of the battery.

8. The method of claim 7 further comprising supplying charge to the terminals of the unit of the battery and measuring a current value of the charge.

9. The method of claim 8 further comprising comparing the current value to a benchmark current value for the unit and determining whether a threshold value of current to the unit has been exceeded.

10. A method for detecting a discharge knee of a battery using an apparatus including storage and a processor coupled to the storage, the method comprising the steps of:
    periodically sampling, by the processor, a voltage in the battery;
    comparing, by the processor, a sum of sampled voltages for a first selected time interval to a sum of sampled voltages for a second selected time interval; and
    determining, by the processor, a knee discharge characteristic if a difference between the compared sums exceeds a threshold value.

11. The method for detecting the discharge knee according to claim 10, further comprising:
    storing, in the storage, the sum of sampled voltages for the first selected time interval; and
    storing, in the storage, the sum of sampled voltages for the second selected time interval.

12. The method for detecting the discharge knee according to claim 10, further comprising:
    summing, by the processor, the sampled voltages for the first selected time interval; and
    summing, by the processor, the sampled voltages for the second selected time interval.

13. The method for detecting the discharge knee according to claim 10, further comprising storing, in the storage, an indication of the knee discharge characteristic.

* * * * *